(12) United States Patent
Gao et al.

(10) Patent No.: US 10,909,441 B2
(45) Date of Patent: Feb. 2, 2021

(54) MODELING AN ACTION COMPLETION CONVERSATION USING A KNOWLEDGE GRAPH

(71) Applicant: MICROSOFT TECHNOLOGY LICENSING, LLC, Redmond, WA (US)

(72) Inventors: Yuqing Gao, Bellevue, WA (US); Ahmed Kamal Atwa Mohamed, Redmond, WA (US)

(*) Notice: Subject to any disclaimer, the term of this patent is extended or adjusted under 35 U.S.C. 154(b) by 820 days.

(21) Appl. No.: 15/626,765

(22) Filed: Jun. 19, 2017

(65) Prior Publication Data

US 2018/0349755 A1    Dec. 6, 2018

Related U.S. Application Data

(60) Provisional application No. 62/514,737, filed on Jun. 2, 2017.

(51) Int. Cl.
| | |
|---|---|
| *G06N 7/00* | (2006.01) |
| *G06N 3/00* | (2006.01) |
| *G06N 20/00* | (2019.01) |
| *G06F 16/242* | (2019.01) |
| *G06F 16/9535* | (2019.01) |
| *G06F 16/9032* | (2019.01) |
| *G06N 5/02* | (2006.01) |

(52) U.S. Cl.
CPC .......... *G06N 3/006* (2013.01); *G06F 16/243* (2019.01); *G06F 16/90332* (2019.01); *G06F 16/9535* (2019.01); *G06N 5/02* (2013.01); *G06N 7/005* (2013.01); *G06N 20/00* (2019.01); *G06N 7/00* (2013.01)

(58) Field of Classification Search
None
See application file for complete search history.

(56) References Cited

U.S. PATENT DOCUMENTS

| | | |
|---|---|---|
| 7,606,714 B2 | 10/2009 | Williams et al. |
| 9,542,447 B1 | 1/2017 | Brennan et al. |

(Continued)

OTHER PUBLICATIONS

Gupta, et al., Information Retrieval with Verbose Queries, SIGIR '15: Proceedings of the 38th International ACM SIGIR Conference on Research and Development in Information Retrieval, 2015, pp. 1121-1124 (Year: 2015).*

(Continued)

*Primary Examiner* — Wilbert L Starks
(74) *Attorney, Agent, or Firm* — Shook, Hardy & Bacon, LLP

(57) ABSTRACT

The technology described herein allows an interactive program to leverage a knowledge graph to maximize the likelihood of successfully understanding the user's query and at the same time minimize the number of turns taken to understand the user. A goal of the technology described herein is to formulate response queries that have a probability of completing the user's requested task accurately while issuing the fewest number of response queries to the user before determining the intended task. In order to accomplish this, the technology combines a reinforced learning mechanism with a knowledge-graph simulation score to determine the optimal response query.

19 Claims, 10 Drawing Sheets

(56) References Cited

U.S. PATENT DOCUMENTS

| | | |
|---|---|---|
| 9,542,648 B2 | 1/2017 | Roberts |
| 2014/0067378 A1 | 3/2014 | Anand et al. |
| 2014/0163965 A1 | 6/2014 | Barve et al. |
| 2014/0280307 A1 | 9/2014 | Gupta et al. |
| 2016/0117593 A1 | 4/2016 | London |
| 2017/0076206 A1 | 3/2017 | Lastras-Montano et al. |

OTHER PUBLICATIONS

Hixon, et al., "Learning Knowledge Graphs for Question Answering through Conversational Dialog", in Proceedings of Conference of the North American Chapter of the Association for Computational Linguistics: Human Language Technologies, May 31, 2015, pp. 851-861.

Jayaram, et al., "Towards a Query-by-Example System for Knowledge Graphs", in Proceedings of Workshop on graph Data management Experiences and Systems, Jun. 22, 2014, pp. 1-6.

"International Search Report and Written Opinion Issued in PCT Application No. PCT/US2018/034009", dated Oct. 16, 2018, 15 Pages.

\* cited by examiner

MODELING AN ACTION COMPLETION CONVERSATION USING A KNOWLEDGE GRAPH

CROSS-REFERENCE TO RELATED APPLICATIONS

This application claims the benefit of U.S. Provisional Application No. 62/514,737 filed Jun. 2, 2017, entitled "MODELING AN ACTION COMPLETION CONVERSATION USING A KNOWLEDGE GRAPH," the entirety of which is herein incorporated by reference.

BACKGROUND

Currently, bots, personal assistant applications, and other programs may attempt a conversation with a person. The machine-learned approaches are geared towards conversations that are not grounded to a knowledge graph. Essentially, the machine-learned models are trained using a series of questions matched with responses. Once trained, the model attempts to determine the response based on a similarity of a received question with the questions provided in the training data. There are also rule-based approaches to bots, but again these are not grounded to a knowledge graph.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The technology described herein allows an interactive program to leverage a knowledge graph to maximize the likelihood of successfully understanding the user's query and at the same time minimize the number of turns taken to understand the user. A turn is the exchange of a question and response with the user. A goal of the technology described herein is to formulate response queries that have a probability of completing the user's requested task accurately while issuing the fewest number of response queries to the user before determining the intended task. In order to accomplish this, the technology combines a reinforced learning mechanism with a knowledge-graph simulation score to determine the optimal response query to pose to the user. Response queries are used when a large number of entities within the knowledge graph are consistent with the initial query.

The reinforced learning mechanism helps avoid asking the user questions based on an entity-type that the user is not likely interested in using to narrow the available options, despite a favorable knowledge-graph simulation score for the entitytype. Conversely, the reinforced learning mechanism can also identify questions that are likely of particular interest to the user. The reinforced learning mechanism is trained via feedback received during conversations. Characteristics associated with positive feedback will receive a positive reinforced learning score. Characteristics associated with negative feedback will result in a negative reinforced learning score.

The technology described herein walks the knowledge graph to simulate filtering by different graph characteristics that are likely to narrow available options quickly. The combination of the reinforced learning score and simulation score are used to determine the characteristic selected to form the question.

BRIEF DESCRIPTION OF THE DRAWINGS

The technology described herein is illustrated by way of example and not limitation in the accompanying figures in which like reference numerals indicate similar elements and in which.

DETAILED DESCRIPTION

Figure 1:
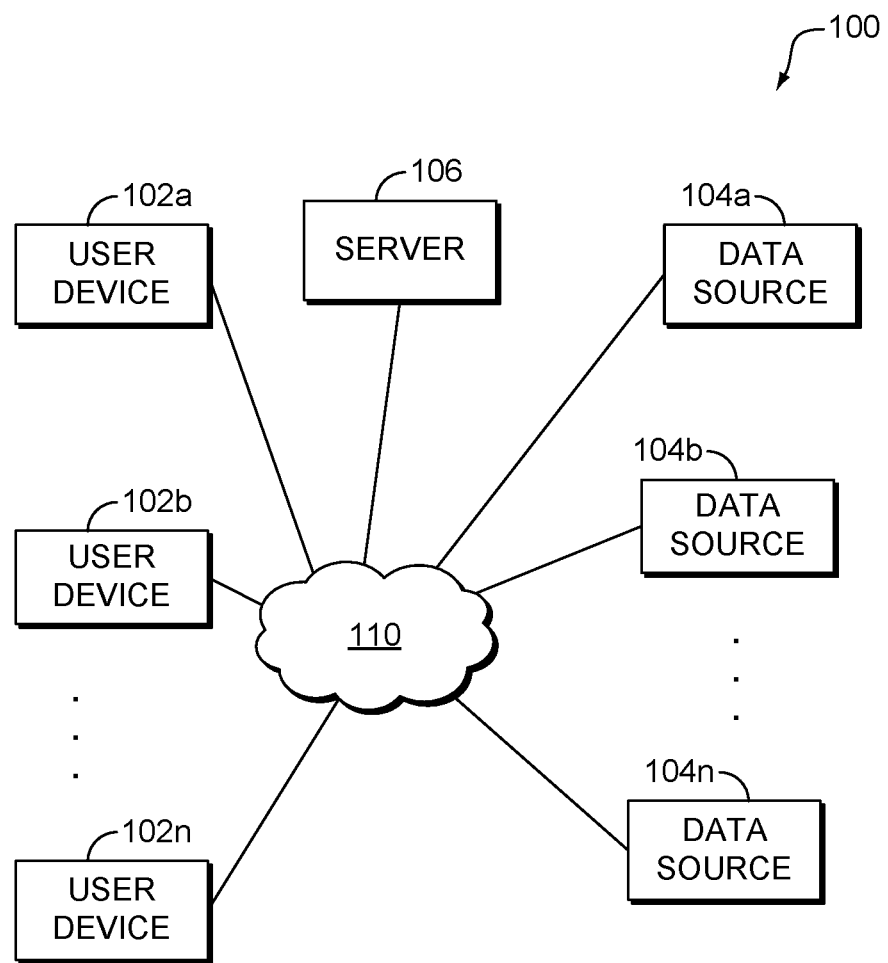
FIG. 1 is a block diagram of an example operating environment suitable for implementations of the present disclosure.

The various technology described herein are set forth with sufficient specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Aspects of the technology described herein can conduct a chat or conversation with a person. The conversation can be audible or visual (e.g., text). The visual conversation occurs through text displayed on a user interface. An audible conversation occurs when a user speaks and receives an audible response. Combinations of audible and visual interactions are possible. For example, the user can type a question and receive an audible response or verbally ask a question and receive a written response.

Initially, a query is received from the user. The query can be received by a bot, a personal assistant application, a search application, a web service, a web page, or through some other interface.

The query is processed into a semantic search query that is compatible with the knowledge graph. The semantic search query comprises entities and relationships within a knowledge graph. For example, the query "find a book by Michael Crichton," comprises the entity-type book and the entity Michael Crichton (entity-type person) along with the relationship "author" between the two entity-types. The entities and relationships identified within the semantic search query map to entities and relationships within a knowledge graph.

The semantic search query can then be passed to a plurality of different domain-specific task engines that complete tasks using the knowledge graph. The domain-specific task engines may have application program interfaces (APIs) that allow them to complete a domain-specific task, such as making an online purchase. The domain-specific task engines can comprise a combination of machine learning and heuristics that allow a domain-specific task engine to converse with a user to complete the task.

Each domain-specific task engine will determine whether it can process the semantic search query. If a domain-specific task engine cannot process the semantic search query, for example because the semantic search query includes entities or relationships not within the portion of the knowledge graph associated with the domain, then it will provide an answer indicating that the semantic search query is not relevant to the domain (or not answer at all). On the other hand, when a domain-specific task engine is able to process the semantic search query, then an answer or a response query for the user is returned. It is possible that a semantic query will result in relevant responses being returned by more than one domain-specific task engine. In this circumstance, an initial disambiguation query may be posed to the user. For example, a user query such as "find entertainment related to Abraham Lincoln" may be relevant to both a movie domain and an audible book domain, each of which may have individual domain-specific task engines. The disambiguation query could ask whether the user is more interested in movies or audible books.

A goal of the technology described herein is to formulate response queries that have a probability of completing the user's requested task accurately while issuing the fewest number of response queries to the user. In order to accomplish this, the technology combines a reinforced learning mechanism with a knowledge-graph simulation score to determine the optimal response query.

The reinforced learning mechanism helps avoid asking the user questions based on an entity-type that the user is not likely interested in using to narrow the available options, despite a favorable knowledge-graph simulation score for the entity-type. Conversely, the reinforced learning mechanism can also identify questions that are likely of particular interest to the user. The reinforced learning mechanism is trained via feedback received during conversations. Characteristics associated with positive feedback will receive a positive reinforced learning score. Characteristics associated with negative feedback will result in a negative reinforced learning score.

The feedback can be explicit or implicit. Explicit feedback can include the user saying something negative about the question about an entity or relationship. The user's response to a question can be classified as negative through a natural language understanding process. Implicit feedback can include exiting the chat session without taking an action.

Returning to the book example above, it may be that thousands of books about Abraham Lincoln exist within the knowledge graph. The technology described herein walks the knowledge graph to simulate different questions about books related to Abraham Lincoln to determine a question that is likely to narrow available options quickly. Hypothetically, the simulation of the knowledge graph may return page number as the best action to narrow down available options. Without the reinforced learning model, the system would ask how many pages the user wants in a book. However, the reinforced learning model may indicate based on previous interactions that users do not respond positively when asked to select a book based on page ranges. The combination of the model optimization score and the reinforced learning score may lower page number as a characteristic to ask about. Instead, the entity-type subject matter might surface as the best query when the reinforced learning model score and the model simulation score are combined.

Continuing with the example, if subject matter was determined to be the best characteristic to ask the user about, a response query can be formulated by combining a template response with subject matter linked to books about Abraham Lincoln within the knowledge graph. A template response question for subject matter could read, "Are you interested in <Entity 1> books about <slot 1>, <slot 2>, <slot 3>, or <slot 4>?" Each slot would be filled with a subject from the knowledge graph related to books about Entity 1 (Abraham Lincoln).

The knowledge graph may include more subject matter entities that can be practically asked about in a question to the user. In this circumstance, the technology can optimize the entities slotted into the pre-formulated response query based on popularity. Popularity for an entity can be determined a number of different ways, including entity occurrence within queries received by a search engine. In this way, the slots are filled with the most popular entities. The popularity of entities can be determined using contextual data about the user. The contextual data can be used to determine user interest. The popularity of different subject matter options can be ranked according to user interest or on a per user basis. The popularity can take both user interest and overall popularity into account.

The response query is then posed to the user and a response is received. If the response includes one of the entities included in the response query, then the knowledge graph is filtered based on the entity in the response and the number of possible responses, such as available books fitting the updated criteria is determined. The updated criteria includes entities and relationships in the original query with the entity or relationships in the response. If the available number is still larger than can be formulated into a practical question (as determined by comparison to a threshold), then an additional optimal response query is determined and formulated. In one aspect, the threshold is less than ten, such as six, four, or three.

If a user response provided in response to any question posed to the user does not include an entity within the response query, but does include an entity that fits within the knowledge graph domain when filtered by the original criteria or modified criteria, then it is used as a filter to further update the filter. As used herein, a filtered knowledge graph comprises all entity-types, entity instances, and relationships that connect to all characteristics that form the filter criteria. For example, if the response query asked if the user was interested in a biography, historical fiction, or Civil War book about Abraham Lincoln and the user replied "by Doris Goodwin" (an author of an Abraham Lincoln biography), then the technology would filter by relationship: author: entity: Doris Kearns Goodwin, along with previously received criteria (e.g., Abraham Lincoln), which might just return a single book (*Team of Rivals* by Doris Kearns Goodwin). The user could then be asked if they want to listen to *Team of Rivals* by Doris Kearns Goodwin.

On the other hand, if the user response to the question does not include an entity within the filtered knowledge graph, then the process starts over using the newly identified entity as a starting point. For example, if the user replied Neil Armstrong, and Neil Armstrong did not match an entity within the knowledge graph filtered by Abraham Lincoln, then the process would start over with a filter based on books about or possibly authored by Neil Armstrong and not books about Abraham Lincoln.

Additional responses can be posed to the user until the user's task is ascertained. Each time a new question is formulated, the knowledge graph can be analyzed to determine the knowledge-graph simulation score for various entities or relationships available in the knowledge graph as filtered by previously received characteristics. The reinforced learning-model score for each available entity can also be calculated. The two scores are then combined to select the best entity or relationship to ask about. The entity or relationship can be combined with a template question to generate the next question communicated to the user.

Once ascertained, the task can be completed by a different application. For example, streaming of a requested audible book could be initiated by passing a request to an audiobook streaming service or application through an API.

Having briefly described an overview of aspects of the technology described herein, an exemplary operating environment in which aspects of the technology described herein may be implemented is described below in order to provide a general context for various aspects.

Turning now to FIG. 1, a block diagram is provided showing an example operating environment 100 in which some aspects of the present disclosure may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, example operating environment 100 includes a number of user devices, such as user devices 102a and 102b through 102n; a number of data sources, such as data sources 104a and 104b through 104n; server 106; and network 110. Each of the components shown in FIG. 1 may be implemented via any type of computing device, such as computing device 1000 described in connection to FIG. 10, for example. These components may communicate with each other via network 110, which may include, without limitation, one or more local area networks (LANs) and/or wide area networks (WANs). In exemplary implementations, network 110 comprises the Internet and/or a cellular network, amongst any of a variety of possible public and/or private networks.

User devices 102a and 102b through 102n can be client devices on the client-side of operating environment 100, while server 106 can be on the server-side of operating environment 100. The user devices can facilitate the completion of tasks, such as searching a map application or navigating a route, and make a record of user activities. The devices can belong to many different users and a single user may use multiple devices. The user activities can be analyzed to determine a user's interests, including geographic areas frequented by the user and the types of point of interest data a user may be likely to access.

Server 106 can comprise server-side software designed to work in conjunction with client-side software on user devices 102a and 102b through 102n so as to implement any combination of the features and functionalities discussed in the present disclosure. For example, the server 106 may run task comletion engine 260, which helps determine what task a user may wish to complete. The server 106 may receive activity records, such as search results and purchase history, from a large number of user devices belonging to many users. This data can be described as crowdsourced data. This division of operating environment 100 is provided to illustrate one example of a suitable environment, and there is no requirement for each implementation that any combination of server 106 and user devices 102a and 102b through 102n remain as separate entities.

User devices 102a and 102b through 102n may comprise any type of computing device capable of use by a user. For example, in one aspect, user devices 102a through 102n may be the type of computing device described in relation to FIG. 10 herein. By way of example and not limitation, a user device may be embodied as a personal computer (PC), a laptop computer, a mobile device, a smartphone, a tablet computer, a smart watch, a wearable computer, a fitness tracker, a virtual reality headset, augmented reality glasses, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, or any combination of these delineated devices, or any other suitable device.

Data sources 104a and 104b through 104n may comprise data sources and/or data systems, which are configured to make data available to any of the various constituents of operating environment 100, or system 200 described in connection to FIG. 2. (For example, in one aspect, one or more data sources 104a through 104n provide (or make available for accessing) user data to user-data collection component 210 of FIG. 2.) Data sources 104a and 104b through 104n may be discrete from user devices 102a and 102b through 102n and server 106 or may be incorporated and/or integrated into at least one of those components. In one aspect, one or more of data sources 104a through 104n comprise one or more sensors, which may be integrated into or associated with one or more of the user device(s) 102a, 102b, or 102n or server 106. Examples of sensed user data made available by data sources 104a through 104n are described further in connection to user-data collection component 210 of FIG. 2. The data sources 104a through 104n can comprise a knowledge graph that stores information about entities and relationships between entities.

Figure 2:
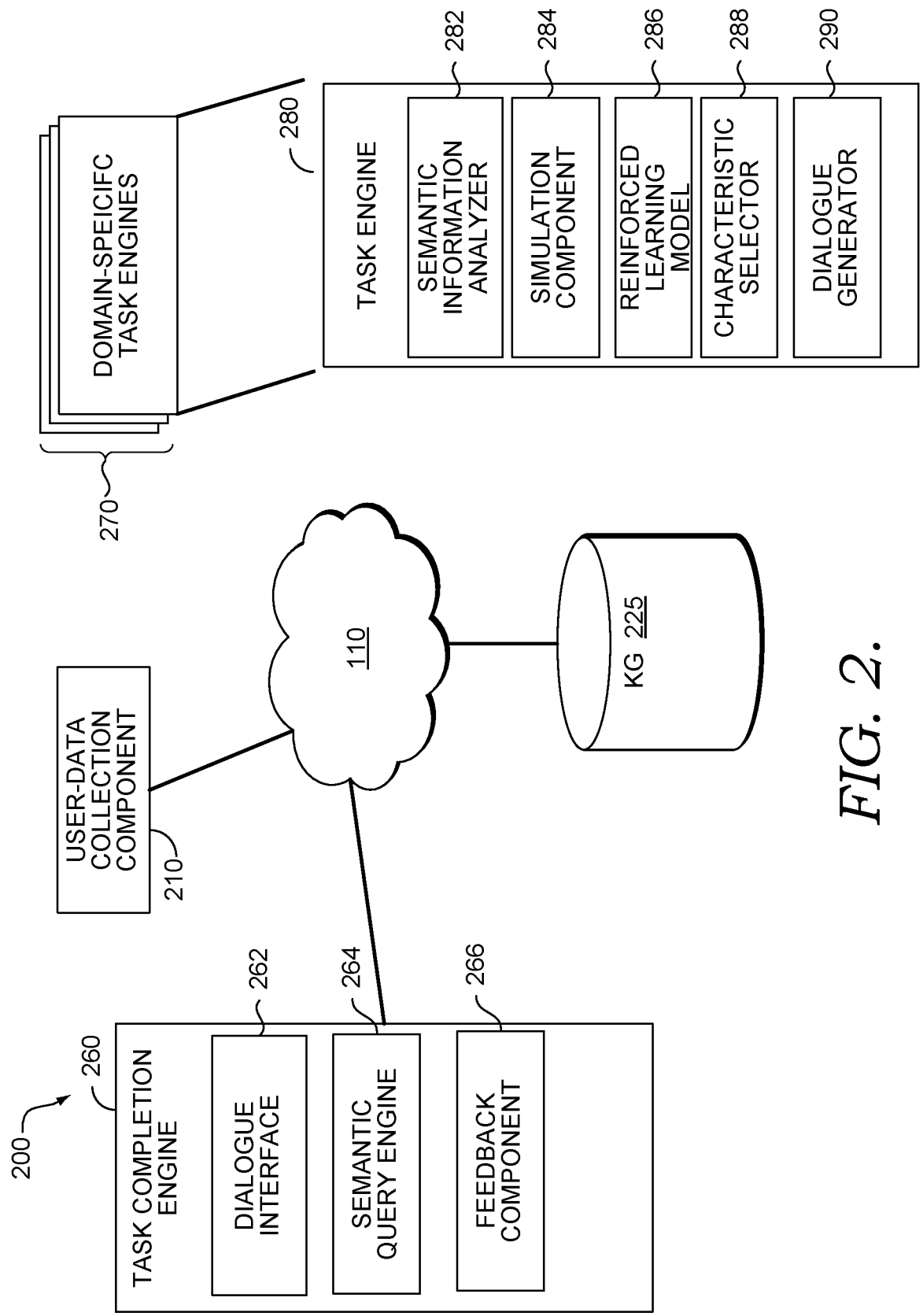
FIG. 2 is a diagram depicting an example computing architecture suitable for implementing aspects of the present disclosure.
Figure 3:
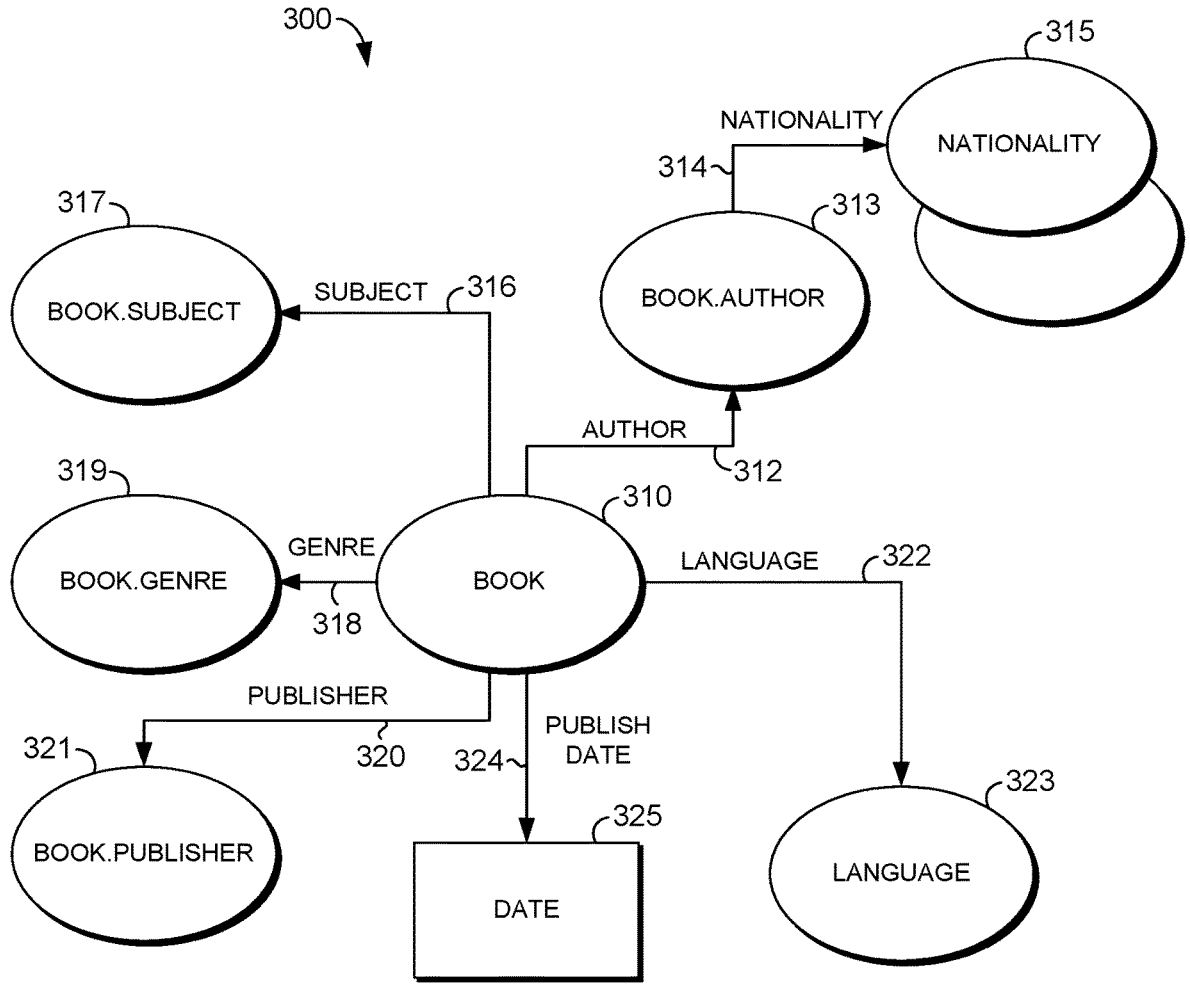
FIG. 3 shows a knowledge graph of the book domain, in accordance with an aspect of the technology described herein.

Operating environment 100 can be utilized to implement one or more of the components of system 200, described in FIG. 2, including components for collecting user data, identifying user interests, receiving user queries related to a task, responding to the query with efficient follow-up questions, identifying the task, and helping the user complete the task.

Referring now to FIG. 2, with FIG. 1, a block diagram is provided showing aspects of an example computing system architecture suitable for implementing an aspect and designated generally as system 200. System 200 represents only one example of a suitable computing system architecture. Other arrangements and elements can be used in addition to or instead of those shown, and some elements may be omitted altogether for the sake of clarity. Further, as with operating environment 100, many of the elements described herein are functional entities that may be implemented as discrete or distributed components or in conjunction with other components, and in any suitable combination and location.

Example system 200 includes network 110, which is described in connection to FIG. 1, and which communicatively connects components of system 200 including user-data collection component 210, task completion engine 260 (including its components 262, 264, and 266), domain-specific task engines 270, domain-specific task engine 280 (including its components 282, 284, 286, 288, and 290), and knowledge graph 225. These components may be embodied as a set of compiled computer instructions or functions, program modules, computer software services, or an arrangement of processes carried out on one or more computer systems, such as computing device 1000 described in connection to FIG. 10, for example.

In one aspect, the functions performed by components of system 200 are associated with one or more personal assistant applications, services, or routines. In particular, such applications, services, or routines may operate on one or more user devices (such as user device 102a), servers (such as server 106), may be distributed across one or more user devices and servers, or be implemented in the cloud. Moreover, in some aspects, these components of system 200 may be distributed across a network, including one or more servers (such as server 106) and client devices (such as user device 102a), in the cloud, or may reside on a user device, such as user device 102a. Moreover, these components, functions performed by these components, or services carried out by these components may be implemented at appropriate abstraction layer(s), such as the operating system layer, application layer, hardware layer, etc., of the computing system(s). Alternatively, or in addition, the functionality of these components and/or the aspects described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein with regards to specific components shown in example system 200, it is contemplated that in some aspects functionality of these components can be shared or distributed across other components.

Continuing with FIG. 2, user-data collection component 210 is generally responsible for accessing or receiving (and in some cases also identifying) user data from one or more data sources, such as data sources 104a and 104b through 104n of FIG. 1. In some aspects, user-data collection component 210 may be employed to facilitate the accumulation of user data of a particular user (or in some cases, a plurality of users including crowdsourced data) for user reinforced learning model 286 or feedback component 266. The data may be received (or accessed), and optionally accumulated, reformatted, and/or combined, by user-data collection component 210 and stored in one or more data stores, where it may be available to other components of system 200. For example, the user data may be stored in or associated with a user profile. In some aspects, any personally identifying data (i.e., user data that specifically identifies particular users) is either not uploaded or otherwise provided from the one or more data sources with user data, is not permanently stored, and/or is not made available to reinforced learning model 286 or feedback component 266.

User data may be received from a variety of sources where the data may be available in a variety of formats. For example, in some aspects, user data received via user-data collection component 210 may be determined via one or more sensors, which may be on or associated with one or more user devices (such as user device 102a), servers (such as server 106), and/or other computing devices. As used herein, a sensor may include a function, routine, component, or combination thereof for sensing, detecting, or otherwise obtaining information such as user data from a data source 104a, and may be embodied as hardware, software, or both. By way of example and not limitation, user data may include data that is sensed or determined from one or more sensors (referred to herein as sensor data), such as location information of mobile device(s), properties or characteristics of the user device(s) (such as device state, charging data, date/time, or other information derived from a user device such as a mobile device), user-activity information (for example: app usage; online activity; searches; voice data such as automatic speech recognition; activity logs; communications data including calls, texts, instant messages, and emails; website posts; other user-data associated with communication events; etc.) including, in some aspects, user activity that occurs over more than one user device, user history, session logs, application data, contacts data, calendar and schedule data, notification data, social-network data, news (including popular or trending items on search engines or social networks), online gaming data, ecommerce activity (including data from online accounts such as Microsoft®, Amazon.com®, Google®, eBay®, PayPal®, video-streaming services, gaming services, or Xbox Live®), user-account (s) data (which may include data from user preferences or settings associated with a personal assistant application or service), home-sensor data, appliance data, global positioning system (GPS) data, vehicle user data, traffic data, weather data (including forecasts), wearable device data (which may include physiological data about the user such as heart rate, pulse oximeter or blood oxygen level, blood pressure, galvanic skin response, or other physiological data capable of being sensed or detected), other user device data (which may include device settings, profiles, network-related information (e.g., network name or ID, domain information, work group information, connection data, Wi-Fi network data, or configuration data, data regarding the model number, firmware, or equipment, device pairings, such as where a user has a mobile phone paired with a Bluetooth headset, for example, or other network-related information)), gyroscope data, accelerometer data, payment or credit card usage data (which may include information from a user's PayPal account), purchase history data (such as information from a user's Xbox Live, Amazon.com, or eBay account), other sensor data that may be sensed or otherwise detected by a sensor (or other detector) component(s) including data derived from a sensor component associated with the user (including location, motion, orientation, position, user-access, user-activity, network-access, user-device-charging, or other data that is capable of being provided by one or more sensor components), data derived based on other data (for example, location data that can be derived from Wi-Fi, Cellular network, or IP address data), and nearly any other source of data that may be sensed or determined as described herein.

In some respects, user data may be provided in user-data streams or signals. A "user signal" can be a feed or stream of user data from a corresponding data source. For example, a user signal could be from a smartphone, a home-sensor device, a GPS device (e.g., for location coordinates), a vehicle-sensor device, a wearable device, a user device, a gyroscope sensor, an accelerometer sensor, a calendar service, an email account, a credit card account, or other data sources. In some aspects, user-data collection component 210 receives or accesses data continuously, periodically, or as needed.

The knowledge graph 225 is a repository for information that can be organized as a semantic graph. Knowledge graphs can contain multiple entities that have relationships with one another. An entity may broadly be defined as a named noun or a named object. Entities are organized by entity-type. Entity-types could include, for exemplary purposes only, a person, a location, a place, a business, an organization, a movie title, a book, a song, etc. There are many examples of entity-types, and this list is intended to be a non-exhaustive list of exemplary entity-types. Relationships connect the entities and form the graph "edges." For example, entity instances within the "book title" entity-type could be connected to the "person" entity-type by the relationship "author." Entity-types may have multiple entity instances. For example, each person in the person entity-type is an instance of the person entity. Entity-types, relationships, and entity instances may be described as knowledge graph characteristics.

Semantic graphs are defined by a schema and composed of nodes and branches connecting the nodes. The nodes represent entity-types. The branches that connect the nodes represent relationships between the entity-types. The relationship can be called Properties. For example, in the movie domain, nodes represent core entity-types for the movie domain, such as the names of a movie (e.g., Titanic), the name of an actor (e.g., Kate Winslet), and a year (e.g., 1997). Relationships in the movie domain include examples like "Director," "Cast," and "Release Year." Thus, the relationship "Cast" could connect entity instance Kate Winslet and entity instance Titanic.

The system 200 includes a task completion engine 260 that receives queries or questions from a user and determines whether the question is related to a task that can be completed by a domain-specific task engine. The task completion engine 260 comprises a dialogue interface 262, a semantic query engine 264, and feedback component 266. The dialogue interface 262 receives questions from a user or from a separate application that received the question from the user and provides responses that form a dialogue. In this way, the dialogue interface 262 receives a series of questions or responses from the user and provides appropriate responses to gather more information from the user. Ultimately, the dialogue interface 262 can conclude the dialogue by asking the user if he or she wishes for assistance completing a task.

The semantic query engine 264 takes a natural-language query and converts it into a semantic query that can be consumed by the domain-specific task engines. The conversion can include extracting words from the natural-language query and matching them to characteristics of the knowledge graph. The relationships between words can also be understood, for example, to determine the difference between a book about Abraham Lincoln from a book by Abraham Lincoln. The conversion can include matching a plurality of words or phrases that might occur in a natural-language query to a single entity, entity-type, or relationship in the knowledge base. For example, the phrases "by," "penned," "written," and "author" could all be mapped to the relationship "Author" in the book domain.

The dialogue interface 262 can determine whether the system is capable of accomplishing a task requested in a query by sending the semantic version of the query to a plurality of domain-specific task engines 270. If no response is received from domain-specific task engines 270, then the dialogue interface 262 can generate a response indicating that it is not able to provide assistance. Alternatively, it may make no response if assistance was not explicitly sought.

When one of the domain-specific task engines provides a dialogue response, the dialogue interface 262 can initiate a conversation. Subsequent responses are then converted to a semantic response and communicated to the domain-specific task engine that provided the initial dialogue response.

The feedback component 266 gathers feedback during the dialogue process. The feedback gathered for one user can be aggregated with feedback from a group of users to refine the reinforced learning model 286. The reinforced learning model 286 can give different weight to group data versus individual user data. In this way, the reinforced learning model 286 can be tuned to individual users.

As mentioned, the feedback can be explicit or implicit. In one sense, every answer can comprise feedback. The feedback component 266 can optionally analyze answers to determine whether the answer is a positive answer or negative answer. Answers that are responsive to the dialogue question can be classified as positive. For example, answers that include an entity instance asked about can comprise a positive response. An answer that does not include any of the entity instances asked about can be classified as a negative response.

As mentioned, the technology described herein comprises a plurality of domain-specific task engines. Each task engine could have access to or be responsible for a portion of the knowledge graph 225. Each domain-specific task engine is trained to complete tasks related to a particular subject matter. The training includes the ability to generate dialogue responses and iteratively determine an entity the user wants to complete a task with. For example, determining a book (entity) the user wishes to buy (task).

The domain-specific task engine 280 is one example of the plurality of domain-specific task engines 270. The domain-specific task engine 280 comprises a semantic information analyzer 282, a simulation component 284, a reinforced learning model 286, a characteristic selector 288, and a dialogue generator 290.

In some aspects, semantic information analyzer 282 interprets semantic queries received from semantic query engine 264. The semantic information analyzer 282 can filter the knowledge graph based on characteristics in the queries received. The filtering can be based on entity-type, entity instance, a relationship, or a combination of these characteristics. As mentioned, a filtered knowledge graph comprises all entities, entity-types, and relationships that are related to all of the active characteristics forming the filter. The semantic information analyzer 282 can determine whether the domain-specific task engine can generate a response to a semantic query. Semantic information analyzer 282 may utilize semantic analysis logic, including rules, conditions, or associations, to determine semantic information related to the user question or to formulate a response. For example, the semantic information analyzer 282 can determine whether terms within a user input match entities, entity-types, or relationships within the knowledge graph based on active filtering. If one or more terms in the semantic query are not found in the relevant portion of the knowledge graph, then no response may be generated. Each domain-specific task engine can access a filtered portion of the knowledge graph. For example, a domain-specific task engine responsible for books can access all parts of the knowledge graph related to the entity-type book. As characteristics are received in queries or responses, the knowledge graph is further filtered using those terms plus book.

Simulation component 284 simulates asking about different characteristics of a filtered knowledge base to determine an entity in which the user is interested. The simulation component 284 may generate a simulation score for each available entity-type or characteristic within the actively filtered knowledge base. The simulation score measures information gain if a particular entity was used to update the filter. The fewer remaining candidate entities, the larger the information gain.

The reinforced learning model 286 processes feedback to classify potential graph characteristics as suitable for use in a dialogue interface. The reinforced learning mechanism identifies entities or relationships within the knowledge graph that do not help the user narrow available options, despite a favorable knowledge-graph simulation score. Conversely, the reinforced learning mechanism can also identify questions that are of particular help to the user. The reinforced learning mechanism is trained via feedback received during a conversation. Entities and relationships associated with positive feedback will receive a positive score. Entities and relationships associated with negative feedback will result in a negative score.

The feedback can be explicit or implicit. Explicit feedback can include the user saying something negative about the question about an entity or relationship. The user's response to a question can be classified as negative through a natural language understanding process. Implicit feedback can include exiting the chat session without taking an action.

In some aspects, the feedback features may be interpreted by a machine classification process to determine an event has occurred. For example, in some aspects, reinforced learning model 286 employs logic, which may include rules, conditions, and/or associations, to identify or classify user feedback as positive or negative. The classifying of feedback can be based on feature-matching or determining similarity in features, which falls under pattern recognition. This type of classification may use pattern recognition, fuzzy logic, neural network, finite state machine, support vector machine, logistic regression, clustering, or machine-learning techniques, similar statistical classification processes, or combinations of these to identify events from user data. For example, a user saying "great question!" may be classified as negative because user's that say "great question!" do not continue the dialogue.

Continuing with system 200 of FIG. 2, the characteristic selector 288 combines the simulation score and the reinforced learning score to select a characteristic that forms the basis of the question posed to the user. Different weights can be given to the reinforced learning score and the simulation score to reach a final score. In another aspect, the reinforced learning score acts as a gate. Candidates with a reinforced learning score in a threshold are excluded, while the remaining candidate with the highest simulation score is selected.

In one aspect, the characteristic selector 288, the reinforced learning model 286, and the simulation component 284 work together using the following process to calculate a final score for each action that is analyzed. The action is a characteristic that may form the basis of a response query posed to the user. In one aspect, the final score is calculated using the function:

$$f(\text{action}) = w0 * Q(\text{ambiguity\_state}, \text{action}\_t) + w1 * IG(\text{action}\_t).$$

The Q value corresponds to the reinforced learning score and the IG corresponds to the simulation score. The Q value is extracted from current RL model and IG is the information gain for the candidate action given as:

$$IG(T, \alpha) = H(T) - \sum_{v \in vals(\alpha)} \frac{|\{x \in T \mid x_\alpha = v\}|}{|T|} \cdot H(\{x \in T \mid x_\alpha = v\})$$

The Q value may be calculated using epsilon greedy method given by:

$$Q(s_t, \alpha_t) \leftarrow \underbrace{Q(s_t, \alpha_t)}_{\text{old value}} + \underbrace{\alpha}_{\text{learning rate}} \cdot \left( \overbrace{\underbrace{r_{t+1}}_{\text{reward}} + \underbrace{\gamma}_{\text{discount factor}} \cdot \underbrace{\max_\alpha Q(s_{t+1}, \alpha)}_{\text{estimate of optimal future value}}}^{\text{learned value}} - \underbrace{Q(s_t, \alpha_t)}_{\text{old value}} \right)$$

The dialogue generator 290 uses the selected characteristic to generate a dialogue response for the user. A response dialogue can be formulated by combining a template response with entities linked to selected characteristics within the knowledge graph. A template response question for subject matter could read, "Are you interested in <Entity 1> books about <slot 1>, <slot 2>, <slot 3>, or <slot 4>?" Each slot would be filled with a subject from the knowledge graph related to books about Entity 1. The knowledge graph may include more subject matter entities than can be practically asked about in a question to the user. In this circumstance, the technology can optimize the entities slotted into the pre-formulated response query based on popularity. Popularity for an entity can be determined a number of different ways including entity occurrence within queries received by a search engine. In this way, the slots are filled with the most popular entities. The popularity of entities can be determined using contextual data about the user. The contextual data can be used to determine user interest. The popularity of different subject matter options can be ranked according to user interest or on a per user basis. The popularity can take both user interest and overall popularity into account.

Turning now to FIGS. 3-6, filtering by entity instances within a knowledge base is illustrated according to an aspect of the present invention. Graph 300 shows nodes and branches within the book domain. A domain-specific task engine designed to help a user complete a task related to books may be associated with the book domain 300. Exemplary tasks include purchasing a book, streaming an audio-book, renting a book, or finding a book in the library.

The book domain of the knowledge graph comprises the book entity-type 310. Instances of the book entity-type 310 could include book titles. The entity-type "book.subject" 317 is connected to the book entity-type 310 by the relationship subject 316. The entity-type "book.genre" 319 is connected to the book entity-type 310 by the relationship genre 318. The entity-type "book.publisher" 321 is connected to the book entity-type 310 by the relationship publisher 320. The entity-type "book.author" 313 is connected to the book entity-type 310 by the relationship author 312. The entity-type "date" 325 is connected to the book entity-type 310 by the relationship publication date 324. The entity-type "language" 323 is connected to the book entity-type 310 by the relationship language 322.

Each of the entity-types can be associated with multiple entity instances. The entity-types can also have relationships with other entities. For example, the entity-type "book-.author" 313 is connected to the nationality entity-type 315 by the relationship nationality 314.

Knowledge graphs can be filtered by knowledge graph characteristics. As mentioned, the knowledge graph characteristics include an entity-type, entity instance, or relationship. For example, in response to a query "Novels about slavery written by African American authors," the knowledge graph could be filtered. As an intermediary step, the natural-language query, "novels about slavery written by African American authors" can be used to generate a semantic query. The semantic query can identify characteristics within a knowledge base. Natural language terms could be mapped to entity-types, entity instances, or relationships to form the semantic query. For example, the semantic query could be entity-type: book, book.subject.instance: slavery, and book.author⇒relationship ethnicity⇒ethnicity.instance: African American.

Figure 4:
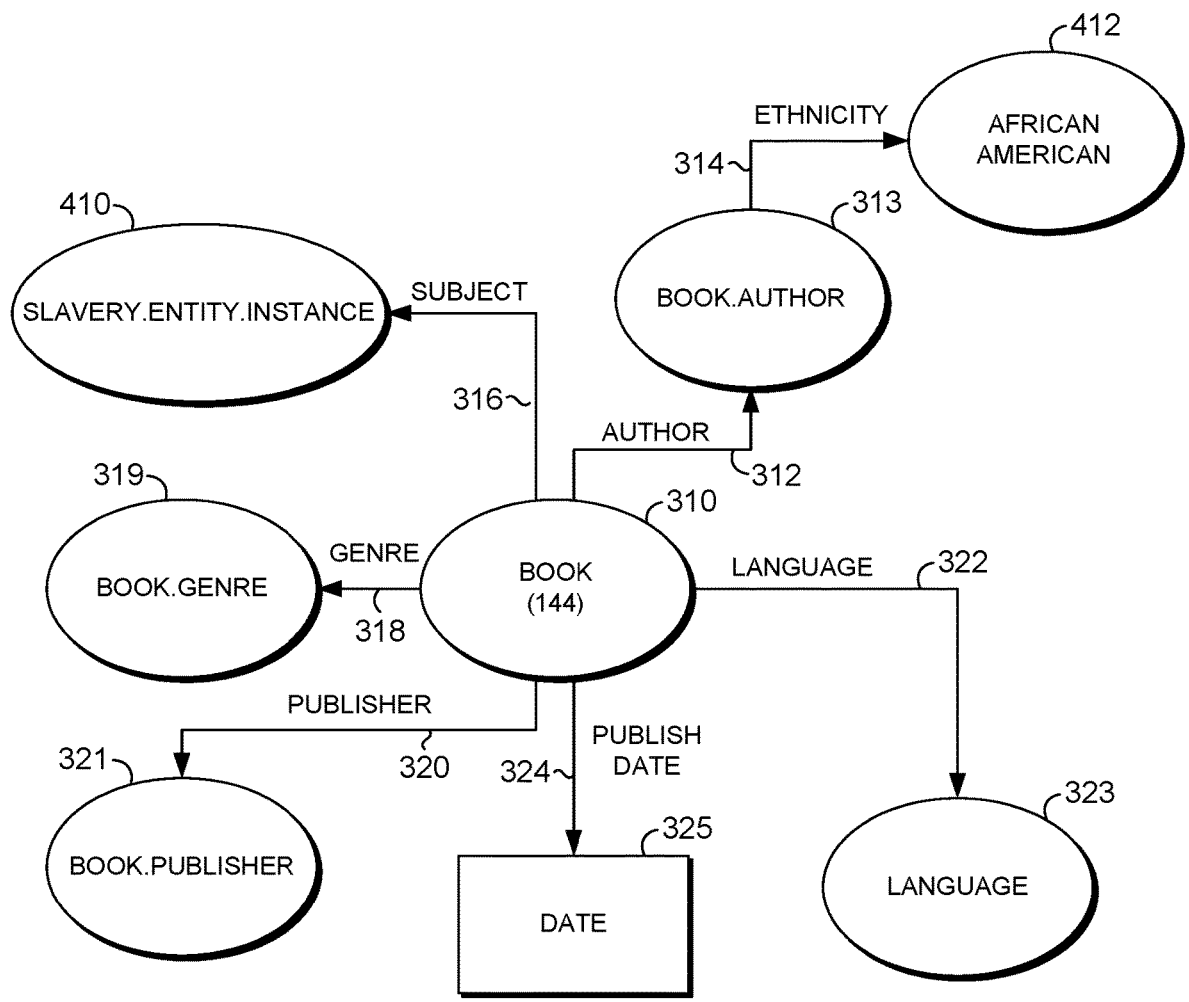
FIG. 4 shows a knowledge graph filtered by features of an initial query, in accordance with an aspect of the technology described herein.

FIG. 4 shows a domain-specific portion of the knowledge graph filtered by book.subject entity-type filtered by entity instance slavery 410 and book author with an ethnicity relationship African American. As an example, this may return 144 book instances about slavery by African American authors. In order to help the user complete a task, the number of candidate book instances needs to be narrowed down. It is typically not practical to ask the user whether they are interested in one of the 144 books. Instead, aspects of the technology select a secondary characteristic available within the filtered knowledge base to ask the user about. The goal is to select a secondary characteristic that will most efficiently narrow the book instances to a manageable amount that can be asked about in a single dialogue question. The secondary characteristic is selected by running a simulation against the various available characteristics to determine an information gain for each characteristic. Generally, the ideal secondary characteristic will allow the book to be selected while asking a minimum number of questions. The characteristics with the largest information gain help minimize dialogue turns. This portion of the analysis may be described as a simulation score. The simulation score can be combined with a reinforced learning score that is generated in response to feedback received from questions asked previously. The feedback can be from a present user as well as a crowd of users. Weights can be given to each score when forming a final score.

Figure 5:
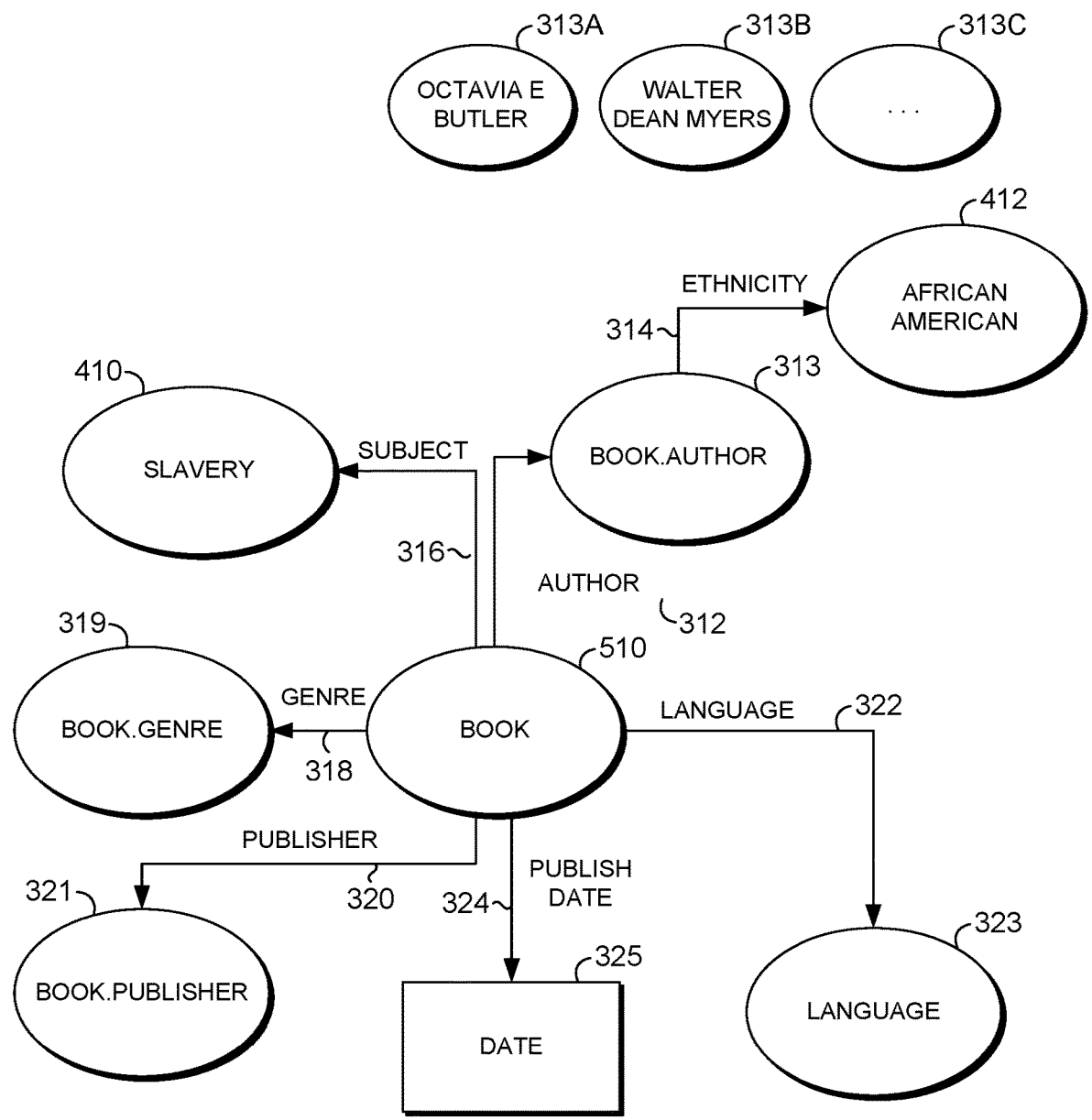
FIG. 5 shows a knowledge graph filtered by features of an initial query and possible authors that could form the basis of a response query, in accordance with an aspect of the technology described herein.

As can be seen, a dialogue response could ask about publication date, the publisher, the book genre, the language, or some other characteristic. For the sake of example, the book.author.instance is determined to have the highest combination of reinforced learning score and simulation score. If only three or four authors were available, then they could be selected for insertion into a response dialogue question. On the other hand, when a relatively large number, such as greater than four or five, of entity instances exist, the most likely entities to be of interest to the user may be determined by popularity or some other criteria. FIG. 5 shows that multiple authors are available including Octavia E Butler 313A, Walter Dean Myers 313B, and others 313C.

In one aspect, the popularity of the entities within the knowledge base or some other source of information, such as search data, is used to select the top entity instances to ask about. In the case of the book domain, sales information, awards, previous user purchases, or other information about authors or specific users could be used to select the authors most likely to be of interest to the user.

Figure 6:
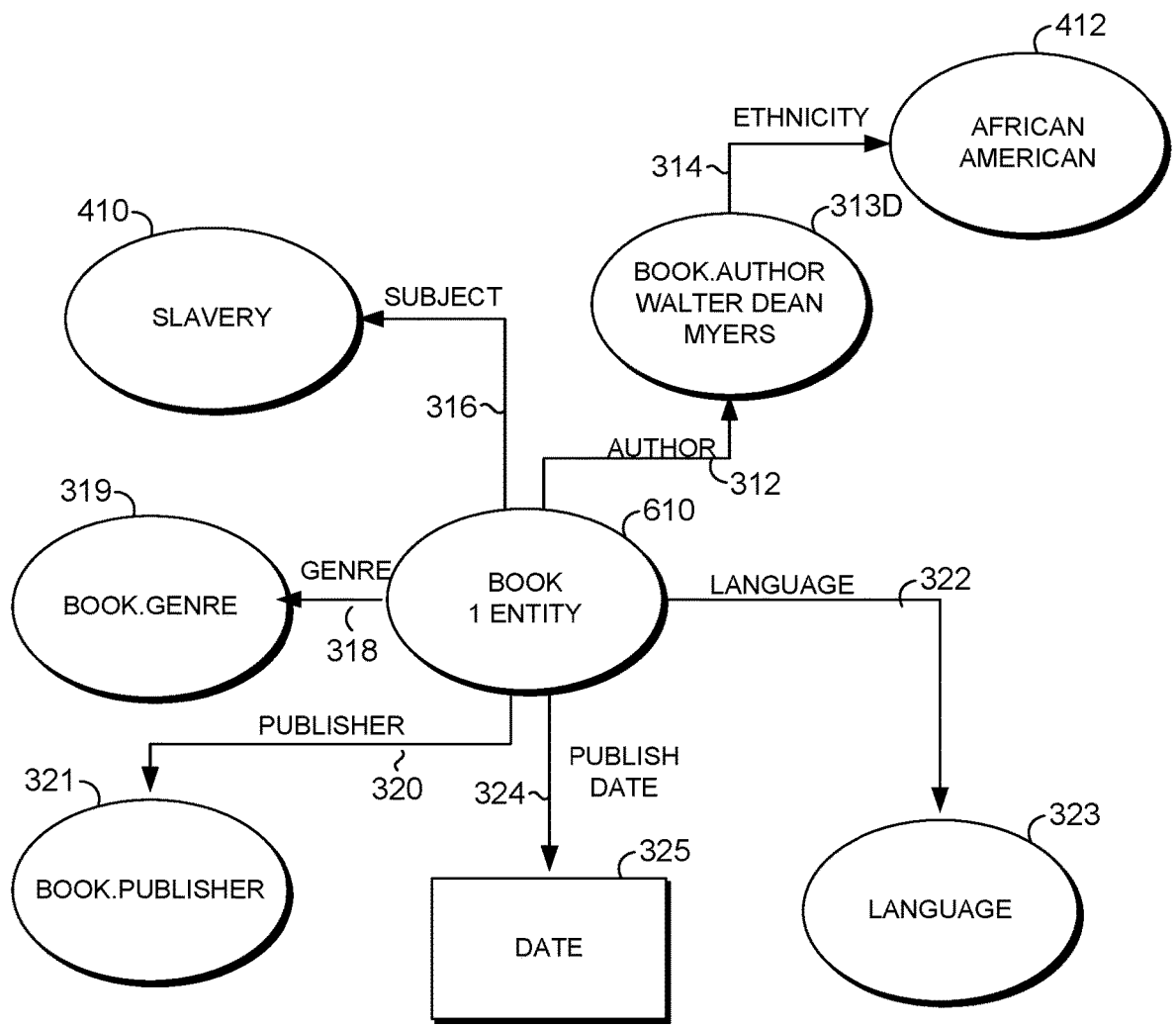
FIG. 6 shows a knowledge graph filtered by features of an initial query and an author provided in a user response to a response query, in accordance with an aspect of the technology described herein.

Once the most relevant authors are selected, they can be inserted into a dialogue response template to form a dialogue response. The dialogue response is then communicated to the user and a response received. In this case, the dialogue response could be: "Alright. I have found books written by Octavia E. Butler, Walter Dean Myers, W. E. B. Du Bois, Frederick Douglass, and John Hope Franklin. Which specific author you would like to read?" If the response was one of these five authors, then the knowledge base could be further filtered by the selected author as shown in FIG. 6, where it is filtered by Walter Dean Myers 313D leaving a single book. The user could then be asked if he wanted to buy the one book by Walter Dean Myers about slavery: *The Glory Field*.

If, on the other hand, the user responded, "published before 1950," then the answer will be recognized as nonresponsive to the dialogue response. The nonresponsive response could be used as feedback to further update the reinforced learning model. In addition, semantic entities could be extracted from the dialogue response to determine if an entity within the response is active within the knowledge graph as filtered by the initial characteristics provided. In this case, "publication date" is an entity-type that is active within the initially filtered knowledge graph. When an active characteristic is available, the characteristic from the user's response is used to further filter the knowledge graph. Though not shown, the entity instance "date prior to 1950" could be inserted into the entity-type publication date and used to filter the candidate books to include only those published before 1950. The process could then repeat if needed to generate a new dialogue response based on the updated filter.

If the nonresponsive response does not include a characteristic within the active knowledge base, then the process can start over using characteristics in the response as an initial filter within the domain, if possible. Thus, the book domain would remain filtered to return a book.

Figure 7:
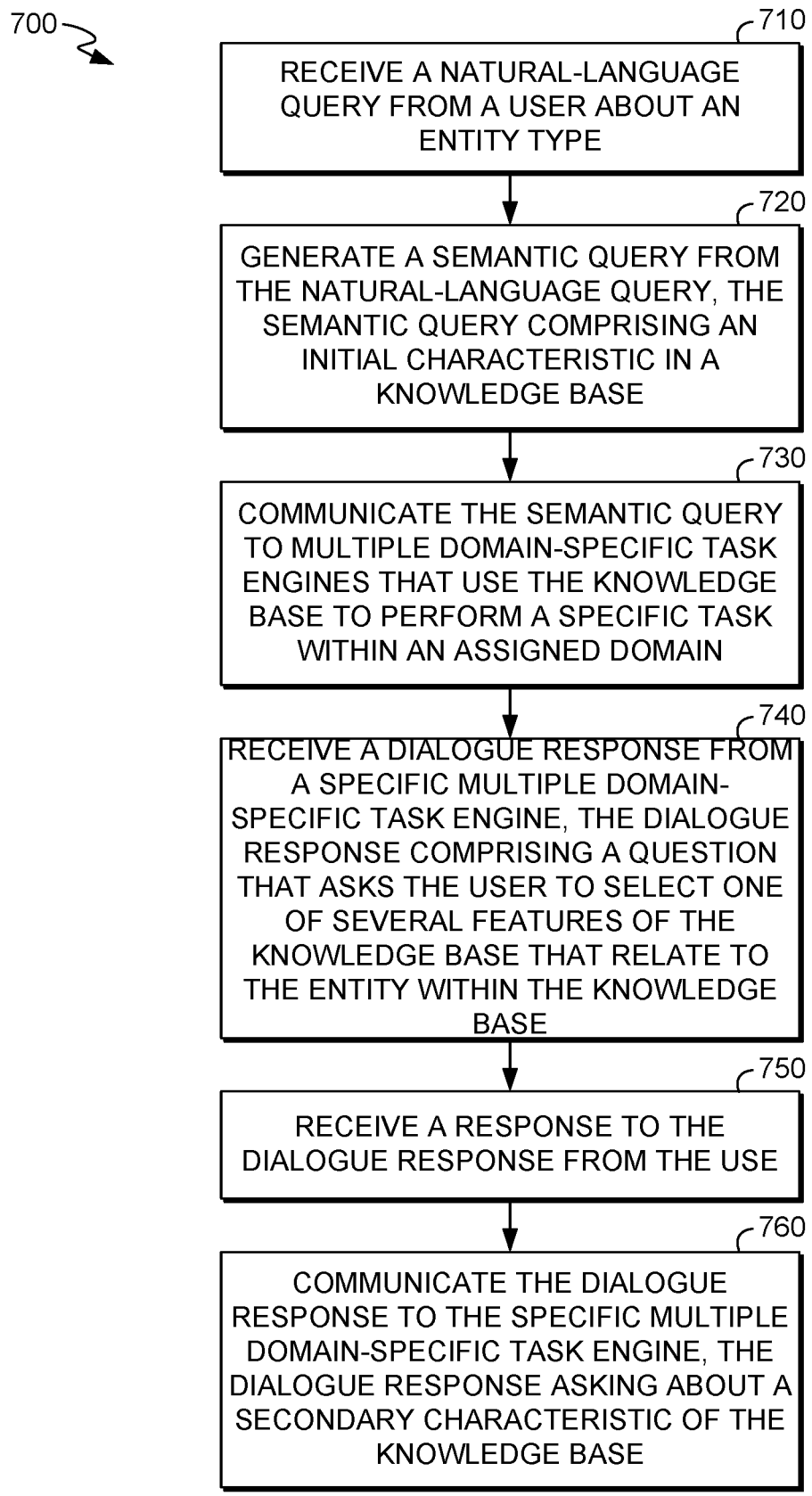
FIGS. 7-9 are flow diagrams showing additional exemplary methods of inferring an energy level, in accordance with an aspect of the technology described herein.

Turning now to FIG. 7, a flow chart of a method 700 of efficiently constructing a dialogue to determine a task request is provided, in accordance with an aspect of the technology described herein.

At step 710, a natural-language query is received from a user. The query can be received by a bot, a personal assistant application, a search application, a web service, a web page, or through some other interface.

At step 720, a semantic query is generated from the natural-language query. The semantic query comprises an initial characteristic in a knowledge base. For example, the query: "find a book by Michael Crichton," comprises the entity-type book and the entity Michael Crichton (entity-type person) along with the relationship "author" between the two entity-types. The entities and relationships identified within the semantic search query map to entities and relationships within a knowledge graph. Michael Crichton could be the initial characteristic in this example, since Michael Crichton is an entity instance within the knowledge base related to books.

The conversion can include extracting words from the natural-language query and matching them to characteristics of the knowledge graph. The relationships between words can also be understood, for example, to determine the difference between a book about Abraham Lincoln from a book by Abraham Lincoln. The conversion can include matching a plurality of words or phrases that might occur in a natural-language query to a single entity, entity-type, or relationship in the knowledge base. For example, the phrases "by," "penned," "written," and "author" could all be mapped to the relationship "Author" in the book domain.

At step 730, the semantic query is communicated to multiple domain-specific task engines that use the knowledge base to perform a specific task within an assigned domain. The domain-specific task engines may have application program interfaces (APIs) that allow them to complete a domain-specific task, such as making an online purchase. The domain-specific task engines can comprise a combination of machine learning and heuristics that allow a domain-specific task engine to converse with a user to complete the task. Each domain-specific task engine is responsible for a specific subject matter or domain within the knowledge graph.

Each domain-specific task engine will determine whether it can process the semantic search query. If a domain-specific task engine cannot process the semantic search query, for example because the semantic search query includes entities or relationships not within the portion of the knowledge graph associated with the domain, then it will provide an answer indicating that the semantic search query is not relevant to the domain (or not answer at all). On the other hand, when a domain-specific task engine is able to process the semantic search query, then an answer or a response query for the user is returned. It is possible that a semantic query will result in relevant responses being returned by more than one domain-specific task engine. In this circumstance, an initial disambiguation query may be posed to the user. For example, a user query, such as "find entertainment related to Abraham Lincoln" may be relevant to both a movie domain and an audible book domain, each of which may have individual domain-specific task engines. The disambiguation query could ask whether the user is more interested in movies or audible books.

At step 740, a dialogue response from a specific multiple domain-specific task engine is received. The dialogue response comprising a question that asks the user to select one of several features of the knowledge base that relate to the entity within the knowledge base. The dialogue response can be formed by merging entities from the knowledge base with a template question. As illustrated previously, if subject matter was determined to be the best characteristic to ask the user about, a response query can be formulated by combining a template response with subject matter linked to books about Abraham Lincoln within the knowledge graph. A template response question for subject matter could read, "Are you interested in <Entity 1> books about <slot 1>, <slot 2>, <slot 3>, or <slot 4>?" Each slot would be filled with a subject from the knowledge graph related to books about Entity 1 (Abraham Lincoln).

The knowledge graph may include more subject matter entities that can be practically asked about in a question to the user. In this circumstance, the technology can optimize the entities slotted into the pre-formulated response query based on popularity. Popularity for an entity can be determined a number of different ways including entity occurrence within queries received by a search engine. In this way, the slots are filled with the most popular entities. The popularity of entities can be determined using contextual data about the user. The contextual data can be used to determine user interest. The popularity of different subject matter options can be ranked according to user interest or on a per user basis. The popularity can take both user interest and overall popularity into account.

At step 750, the method includes receiving a response to the dialogue response from the user. The response may be in written form or verbal.

At step 760, the method includes communicating the dialogue response to the specific multiple domain-specific task engine. The dialogue response asks about a secondary characteristic of the knowledge base. If the response includes one of the entities included in the response query, then the knowledge graph is filtered based on the entity in the response and the number of possible responses, such as available books fitting the updated criteria, is determined. The updated criteria includes entities and relationships in the original query with the entity or relationships in the response. If the available number is still larger than can be formulated into a practical question (as determined by comparison to a threshold), then an additional optimal response query is determined and formulated. In one aspect, the threshold is less than ten, such as six, four, or three.

If a user response provided in response to any question posed to the user does not include an entity within the response query, but does include an entity that fits within the knowledge graph domain when filtered by the original criteria or modified criteria, then it is used as a filter to further update the filter. As used herein, a filtered knowledge graph comprises all entity-types, entity instances, and relationships that connect to all characteristics that form the filter criteria. For example, if the response query asked if the user was interested in a biography, historical fiction, or Civil War book about Abraham Lincoln and the user replied "by Doris Goodwin" (an author of an Abraham Lincoln biography), then the technology would filter by relationship: author: entity: Doris Kearns Goodwin, along with previously received criteria (e.g., Abraham Lincoln), which might just return a single book (*Team of Rivals* by Doris Kearns Goodwin). The user could then be asked if they want to listen to *Team of Rivals* by Doris Kearns Goodwin.

On the other hand, if the user response to the question does not include an entity within the filtered knowledge graph, then the process starts over using the newly identified entity as a starting point. For example, if the user replied Neil Armstrong, and Neil Armstrong did not match an entity within the knowledge graph filtered by Abraham Lincoln, then the process would start over with a filter based on books about or possibly authored by Neil Armstrong and not books about Abraham Lincoln.

Figure 8:
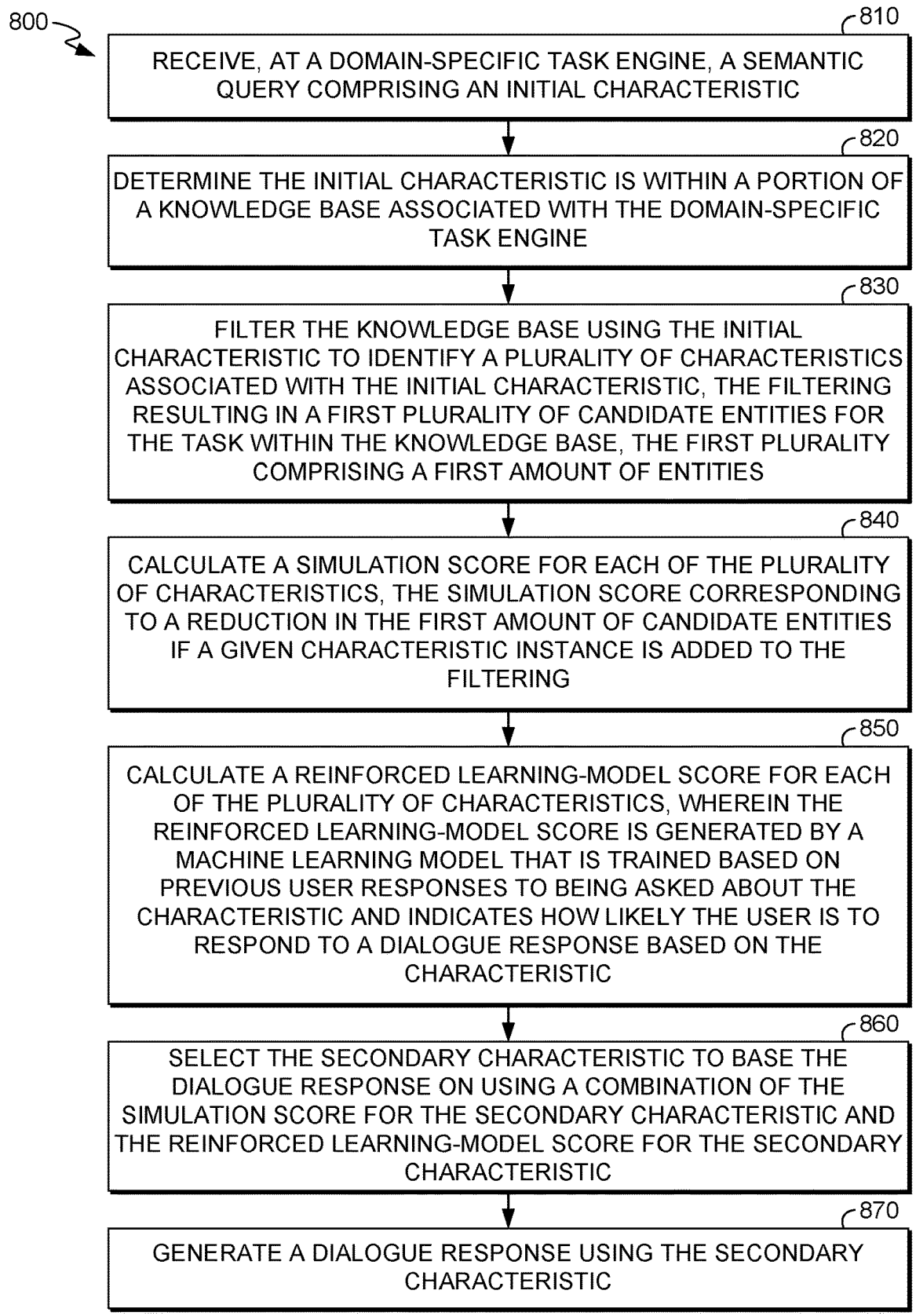

Turning now to FIG. 8, a flow chart of a method 800 of efficiently constructing a dialogue to determine a task request is provided, in accordance with an aspect of the technology described herein.

At step 810, a semantic query comprising an initial characteristic is received at a domain-specific task engine. The semantic query is in a format that comprises characteristics of the knowledge graph. For example, the query: "find a book by Michael Crichton," comprises the entity-type book and the entity Michael Crichton (entity-type person) along with the relationship "author" between the two entity-types. The entities and relationships identified within the semantic search query map to entities and relationships within a knowledge graph. Michael Crichton could be the initial characteristic in this example, since Michael Crichton is an entity instance within the knowledge base related to books.

At step 820, the initial characteristic is determined to be within a portion of a knowledge base associated with the domain-specific task engine. As mentioned, each domain-specific task engine is responsible for a subject matter area. For example, a domain-specific task engine responsible for the movie domain may have access to any portion of the knowledge graph linked to the central entity-type movie. If the initial characteristic is within the portion of the knowledge graph linked to movies, then it is associated with the domain-specific task engine responsible for the movie domain.

At step 830, the knowledge base is filtered using the initial characteristic to identify a plurality of characteristics associated with the initial characteristic. The filtering results in a first plurality of candidate entities for the task within the knowledge base. The first plurality comprises a first amount of entities. As used herein, a filtered knowledge graph comprises all entity-types, entity instances, and relationships that connect to all characteristics that form the filter criteria. In this case, all of the knowledge graph characteristics that are within the domain and have a relationship with the initial characteristic are part of the active filter.

At step 840, a simulation score is calculated for each of the plurality of characteristics. The simulation score corresponds to a reduction in the first amount of candidate entities if a given characteristic instance is added to the filtering. Calculation of a simulation score has been described above.

At step 850, a reinforced learning-model score is calculated for each of the plurality of characteristics. The reinforced learning-model score is generated by a machine-learning model that is trained based on previous user responses to being asked about the characteristic and indicates how likely the user is to respond to a dialogue response based on the characteristic. The reinforced learning score has been described above.

At step 860, the secondary characteristic is selected to base the dialogue response on using a combination of the simulation score for the secondary characteristic and the reinforced learning-model score for the secondary characteristic.

At step 870, a dialogue response is generated using the secondary characteristic. The dialogue response can be formed by merging entities from the knowledge base with a template question. As illustrated previously, if subject matter was determined to be the best characteristic to ask the user about, a response query can be formulated by combining a template response with subject matter linked to books about Abraham Lincoln within the knowledge graph. A template response question for subject matter could read, "Are you interested in <Entity 1> books about <slot 1>, <slot 2>, <slot 3>, or <slot 4>?" Each slot would be filled with a subject from the knowledge graph related to books about Entity 1 (Abraham Lincoln).

Figure 9:
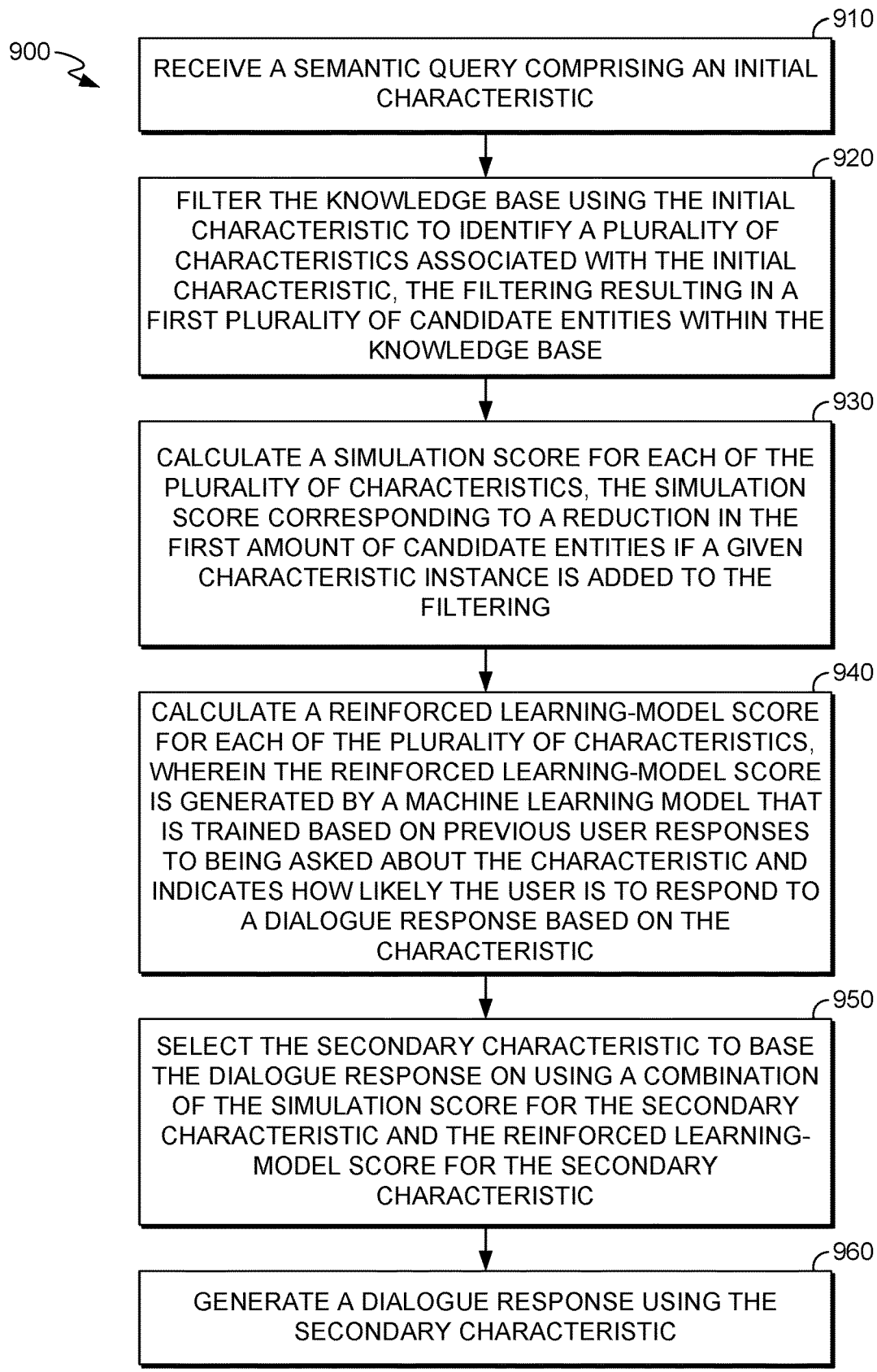

Turning now to FIG. 9, a flow chart of a method 900 of efficiently constructing a dialogue to determine a task request is provided, in accordance with an aspect of the technology described herein.

At step 910, a semantic query comprising an initial characteristic is received. The semantic query can be derived from a natural-language query provided by a user. The semantic query is in a format that comprises characteristics of the knowledge graph. For example, the query: "find a book by Michael Crichton," comprises the entity-type book and the entity Michael Crichton (entity-type person) along with the relationship "author" between the two entity-types. The entities and relationships identified within the semantic search query map to entities and relationships within a knowledge graph. Michael Crichton could be the initial characteristic in this example, since Michael Crichton is an entity instance within the knowledge base related to books.

At step 920, the knowledge base is filtered using the initial characteristic to identify a plurality of characteristics associated with the initial characteristic, the filtering resulting in a first plurality of candidate entities within the knowledge base. The first plurality comprises a first amount of entities. As used herein, a filtered knowledge graph comprises all entity-types, entity instances, and relationships that connect to all characteristics that form the filter criteria. In this case, all of the knowledge graph characteristics that are within the domain and have a relationship with the initial characteristic are part of the active filter.

At step 930, a simulation score is calculated for each of the plurality of characteristics. The simulation score corresponds to a reduction in the first amount of candidate entities if a given characteristic instance is added to the filtering. The simulation score has been described above.

At step 940, a reinforced learning-model score is calculated for each of the plurality of characteristics. The reinforced learning-model score is generated by a machine-learning model that is trained based on previous user responses to being asked about the characteristic and indicates how likely the user is to respond to a dialogue response based on the characteristic. The reinforced learning score has been described above.

At step 950, the secondary characteristic to base the dialogue response on is selected using a combination of the simulation score for the secondary characteristic and the reinforced learning-model score for the secondary characteristic.

At step 960, a dialogue response is generated using the secondary characteristic. The dialogue response can be formed by merging entities from the knowledge base with a template question. As illustrated previously, if subject matter was determined to be the best characteristic to ask the user about, a response query can be formulated by combining a template response with subject matter linked to books about Abraham Lincoln within the knowledge graph. A template response question for subject matter could read, "Are you interested in <Entity 1> books about <slot 1>, <slot 2>, <slot 3>, or <slot 4>?" Each slot would be filled with a subject from the knowledge graph related to books about Entity 1 (Abraham Lincoln).

Exemplary Operating Environment

Figure 10:
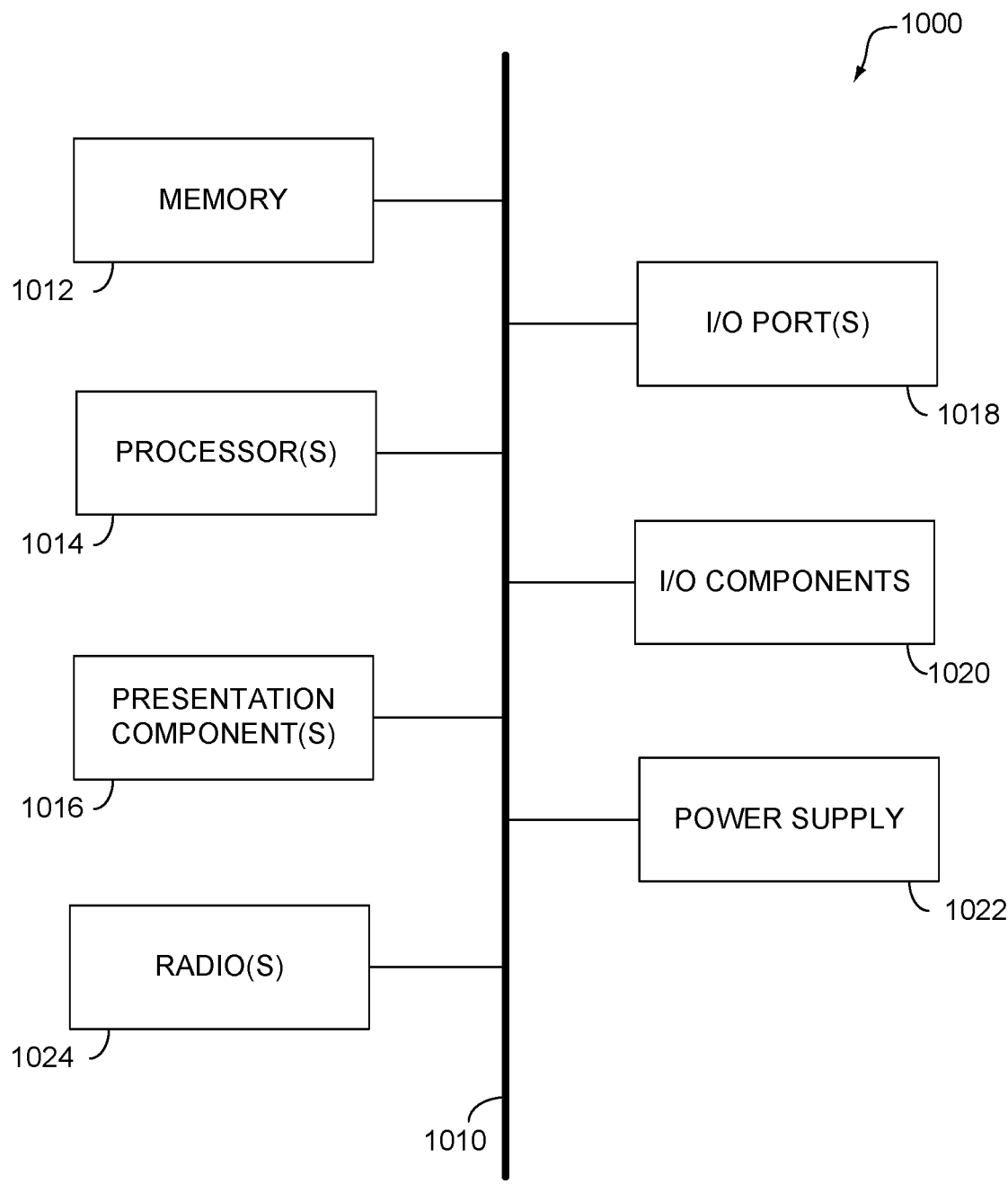
FIG. 10 is a block diagram of an exemplary computing environment suitable for use in implementing aspects of the technology described herein.

Referring to the drawings in general, and initially to FIG. 10 in particular, an exemplary operating environment for implementing aspects of the technology described herein is shown and designated generally as computing device 1000. Computing device 1000 is but one example of a suitable computing environment and is not intended to suggest any limitation as to the scope of use of the technology described herein. Neither should the computing device 1000 be interpreted as having any dependency or requirement relating to any one or combination of components illustrated.

The technology described herein may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. The technology described herein may be practiced in a variety of system configurations, including handheld devices, consumer electronics, general-purpose computers, specialty computing devices, etc. Aspects of the technology described herein may also be practiced in distributed computing environments where tasks are performed by remote-processing devices that are linked through a communications network.

With continued reference to FIG. 10, computing device 1000 includes a bus 1010 that directly or indirectly couples the following devices: memory 1012, one or more processors 1014, one or more presentation components 1016, input/output (I/O) ports 1018, I/O components 1020, and an illustrative power supply 1022. Bus 1010 represents what may be one or more busses (such as an address bus, data bus, or a combination thereof). Although the various blocks of FIG. 10 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art and reiterate that the diagram of FIG. 10 is merely illustrative of an exemplary computing device that can be used in connection with one or more aspects of the technology described herein. Distinction is not made between such categories as "workstation," "server," "laptop," "handheld device," etc., as all are contemplated within the scope of FIG. 10 and refer to "computer" or "computing device."

Computing device 1000 typically includes a variety of computer-readable media. Computer-readable media can be any available media that can be accessed by computing device 1000 and includes both volatile and nonvolatile, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 1012 includes computer storage media in the form of volatile and/or nonvolatile memory. The memory 1012 may be removable, non-removable, or a combination thereof. Exemplary memory includes solid-state memory, hard drives, optical-disc drives, etc. Computing device 1000 includes one or more processors 1014 that read data from various entities such as bus 1010, memory 1012, or I/O components 1020. Presentation component(s) 1016 present data indications to a user or other device. Exemplary presentation components 1016 include a display device, speaker, printing component, vibrating component, etc. I/O ports 1018 allow computing device 1000 to be logically coupled to other devices, including I/O components 1020, some of which may be built in.

Illustrative I/O components include a microphone, joystick, game pad, satellite dish, scanner, printer, display device, wireless device, a controller (such as a stylus, a keyboard, and a mouse), a natural user interface (NUI), and the like. In aspects, a pen digitizer (not shown) and accompanying input instrument (also not shown but which may include, by way of example only, a pen or a stylus) are provided in order to digitally capture freehand user input. The connection between the pen digitizer and processor(s) 1014 may be direct or via a coupling utilizing a serial port, parallel port, and/or other interface and/or system bus known in the art. Furthermore, the digitizer input component may be a component separated from an output component such as a display device, or in some aspects, the usable input area of a digitizer may coexist with the display area of a display device, be integrated with the display device, or may exist as a separate device overlaying or otherwise appended to a display device. Any and all such variations, and any combination thereof, are contemplated to be within the scope of aspects of the technology described herein.

An NUI processes air gestures, voice, or other physiological inputs generated by a user. Appropriate NUI inputs may be interpreted as ink strokes for presentation in association with the computing device 1000. These requests may be transmitted to the appropriate network element for further processing. An NUI implements any combination of speech recognition, touch and stylus recognition, facial recognition, biometric recognition, gesture recognition both on screen and adjacent to the screen, air gestures, head and eye tracking, and touch recognition associated with displays on the computing device 1000. The computing device 1000 may be equipped with depth cameras, such as stereoscopic camera systems, infrared camera systems, RGB camera systems, and combinations of these, for gesture detection and recognition. Additionally, the computing device 1000 may be equipped with accelerometers or gyroscopes that enable detection of motion. The output of the accelerometers or gyroscopes may be provided to the display of the computing device 1000 to render immersive augmented reality or virtual reality.

A computing device may include a radio 1024. The radio 1024 transmits and receives radio communications. The computing device may be a wireless terminal adapted to receive communications and media over various wireless networks. Computing device 1000 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth connection to another computing device is a second example of a short-range connection. A long-range connection may include a connection using one or more of CDMA, GPRS, GSM, TDMA, and 802.16 protocols.

Embodiments

The technology described herein has been described in relation to particular aspects, which are intended in all respects to be illustrative rather than restrictive. While the technology described herein is susceptible to various modifications and alternative constructions, certain illustrated aspects thereof are shown in the drawings and have been described above in detail. It should be understood, however, that there is no intention to limit the technology described herein to the specific forms disclosed, but on the contrary, the intention is to cover all modifications, alternative constructions, and equivalents falling within the spirit and scope of the technology described herein.

What is claimed is:

1. One or more computer storage media comprising computer-executable instructions that when executed by a computing device cause the computing device to efficiently construct a dialogue to determine a task request, comprising:
    receiving a natural-language query from a user;
    generating a semantic query from the natural-language query, the semantic query comprising an initial characteristic in a knowledge base;
    communicating the semantic query to multiple domain-specific task engines that use the knowledge base to perform a specific task within an assigned domain;
    receiving a dialogue response from a specific domain-specific task engine, the dialogue response comprising a question that asks the user to select one of several features of the knowledge base that relate to the initial characteristic within the knowledge base, the dialogue response generated by inserting instances of a secondary characteristic into a template response with slots for the instances of the secondary characteristic;
    receiving a response to the dialogue response from the user; and
    communicating the dialogue response to the specific domain-specific task engine, the dialogue response asking about the secondary characteristic of the knowledge base.

2. The media of claim 1, wherein the initial characteristic is one of an entity-type, an entity instance, or a relationship.

3. The media of claim 1, further comprising generating the dialogue response by:
    filtering the knowledge base using the initial characteristic to identify a plurality of characteristics associated with the initial characteristic, the filtering resulting in a first plurality of candidate entities for the task, the first plurality comprising a first amount of candidate entities;
    calculating a simulation score for each of the plurality of characteristics, the simulation score corresponding to a reduction in the first amount of candidate entities if a given characteristic instance is added to the filtering;
    calculating a reinforced learning-model score for each of the plurality of characteristics, wherein the reinforced learning-model score is generated by a machine-learning model that is trained based on previous user responses to being asked about a specific characteristic and indicates how likely the user is to respond to the dialogue response based on the specific characteristic; and
    selecting the secondary characteristic to base the dialogue response on using a combination of the simulation score for the secondary characteristic and the reinforced learning-model score for the secondary characteristic.

4. The media of claim 3, wherein the method further comprises:
    receiving a response from the user comprising an instance of the secondary characteristic;
    re-filtering the knowledge base using the secondary characteristic in addition to the initial characteristic to generate a second plurality of candidate entities for the task; and
    asking the user for permission to complete the task based on one of the entities from the second plurality of candidate entities.

5. The media of claim 3, wherein the method further comprises:
    receiving a response from the user that comprises a new characteristic that is not an instance of the secondary characteristic;
    determining the new characteristic is one of the plurality of characteristics;
    re-filtering the knowledge base using the new characteristic in addition to the initial characteristic to generate a second plurality of candidate entities for the task; and
    asking the user for permission to complete the task based on one of the entities from the second plurality of candidate entities.

6. The media of claim 3, wherein the method further comprises:
    receiving a response from the user that comprises a new characteristic that is not an instance of the secondary characteristic;
    determining the new characteristic is not one of the plurality of characteristics; and
    re-filtering the knowledge base using the new characteristic and not the initial characteristic to generate a second plurality of candidate entities.

7. A method of efficiently constructing a dialogue to determine a task request, the method comprising:
    receiving, at a domain-specific task engine, a semantic query comprising an initial characteristic;
    determining the initial characteristic is within a portion of a knowledge base associated with the domain-specific task engine;
    filtering the knowledge base using the initial characteristic to identify a plurality of characteristics associated with the initial characteristic, the filtering resulting in a first plurality of candidate entities for a task within the knowledge base, the first plurality comprising a first amount of candidate entities;
    calculating a simulation score for each of the plurality of characteristics, the simulation score corresponding to a reduction in the first amount of candidate entities if a given characteristic instance is added to the filtering;
    calculating a reinforced learning-model score for each of the plurality of characteristics, wherein the reinforced learning-model score is generated by a machine-learning model that is trained based on previous user responses to being asked about a specific characteristic and indicates how likely the user is to respond to a dialogue response based on the specific characteristic;
    selecting a secondary characteristic to base the dialogue response on using a combination of the simulation score for the secondary characteristic and the reinforced learning-model score for the secondary characteristic; and
    generating the dialogue response using the secondary characteristic.

8. The method of claim 7, wherein generating the dialogue response comprises inserting instances of the secondary characteristic into a template response with slots for the instances of the secondary characteristic.

9. The method of claim 7, further comprising:
receiving a response to the dialogue response comprising an instance of the secondary characteristic; and
re-filtering the knowledge base using the secondary characteristic in addition to the initial characteristic to generate a second plurality of candidate entities for the task.

10. The method of claim 7, further comprising:
receiving a response to the dialogue response that comprises a new characteristic that is not an instance of the secondary characteristic;
determining the new characteristic is one of the plurality of characteristics; and
re-filtering the knowledge base using the new characteristic in addition to the initial characteristic to generate a second plurality of candidate entities for the task.

11. The method of claim 10, wherein the initial characteristic is an entity-type, and wherein the new characteristic is a relationship between the entity-type and a different entity-type.

12. The method of claim 7, further comprising:
receiving a response from the user that comprises a new characteristic that is not an instance of the secondary characteristic;
determining the new characteristic is not one of the plurality of characteristics; and
re-filtering the knowledge base using the new characteristic and not the initial characteristic to generate a second plurality of candidate entities.

13. The method of claim 7, wherein the secondary characteristic is a specific entity-type.

14. The method of claim 7, wherein the initial characteristic is one of an entity-type, an entity instance, or a relationship.

15. A method of efficiently constructing a dialogue to determine a task request comprising:
receiving a semantic query comprising an initial characteristic;
filtering a knowledge base using the initial characteristic to identify a plurality of characteristics associated with the initial characteristic, the filtering resulting in a first plurality of candidate entities within the knowledge base, the first plurality comprising a first amount of candidate entities;
calculating a simulation score for each of the plurality of characteristics, the simulation score corresponding to a reduction in the first amount of candidate entities if a given characteristic instance is added to the filtering;
calculating a reinforced learning-model score for each of the plurality of characteristics, wherein the reinforced learning-model score is generated by a machine-learning model that is trained based on previous user responses to being asked about a specific characteristic and indicates how likely the user is to respond to a dialogue response based on the specific characteristic;
selecting a secondary characteristic to base the dialogue response on using a combination of the simulation score for the secondary characteristic and the reinforced learning-model score for the secondary characteristic; and
generating the dialogue response using the secondary characteristic.

16. The method of claim 15, further comprising:
receiving a response from the user that comprises a new characteristic that is not an instance of the secondary characteristic;
determining the new characteristic is not one of the plurality of characteristics; and
re-filtering the knowledge base using the new characteristic and not the initial characteristic to generate a second plurality of candidate entities.

17. The method of claim 15, further comprising:
receiving a response to the dialogue response that comprises a new characteristic that is not an instance of the secondary characteristic;
determining the new characteristic is one of the plurality of characteristics; and
re-filtering the knowledge base using the new characteristic in addition to the initial characteristic to generate a second plurality of candidate entities for the task.

18. The method of claim 15, wherein generating the dialogue response comprises inserting instances of the secondary characteristic into a template response with slots for the instances of the secondary characteristic.

19. The method of claim 15, wherein the initial characteristic is one of an entity type, an entity instance, or a relationship.

* * * * *